Aug. 5, 1941.  B. E. THOMAS  2,251,722
EMERGENCY SUPPORT FOR FLEXIBLE COUPLINGS
Filed Aug. 8, 1939  2 Sheets-Sheet 1
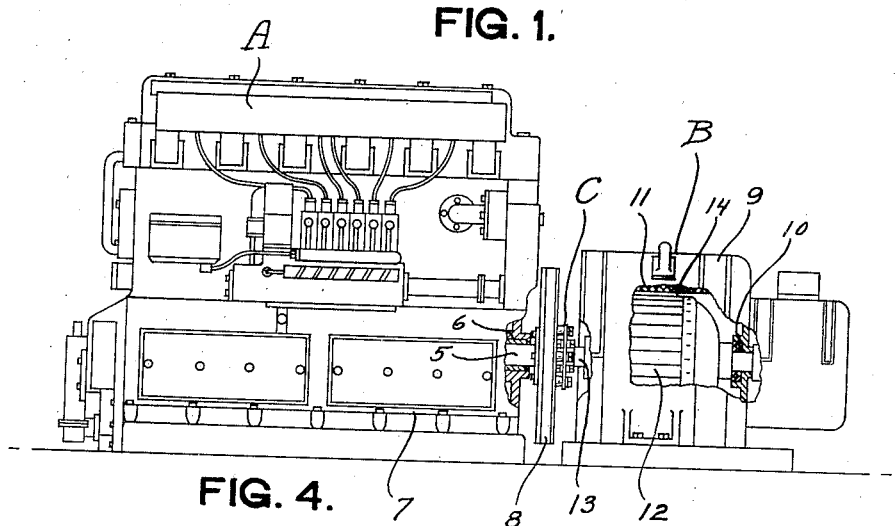
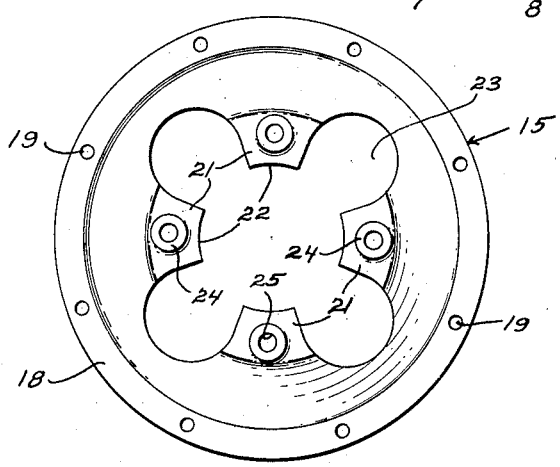
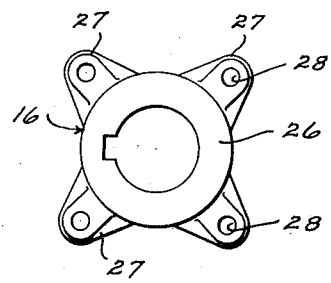
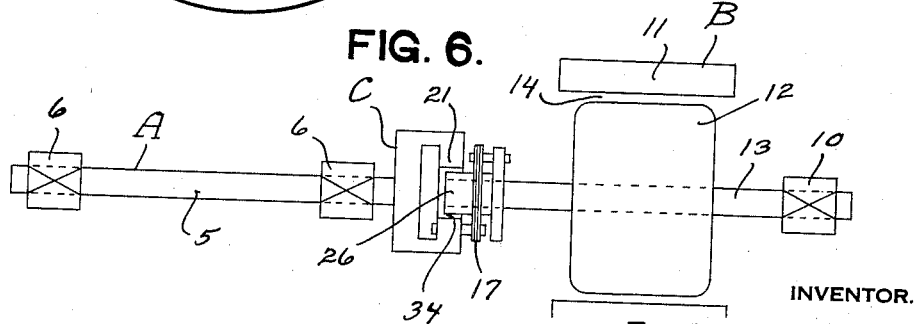
INVENTOR.
Bertha E. Thomas
BY Lancaster, Allwine and Rommel
ATTORNEYS.

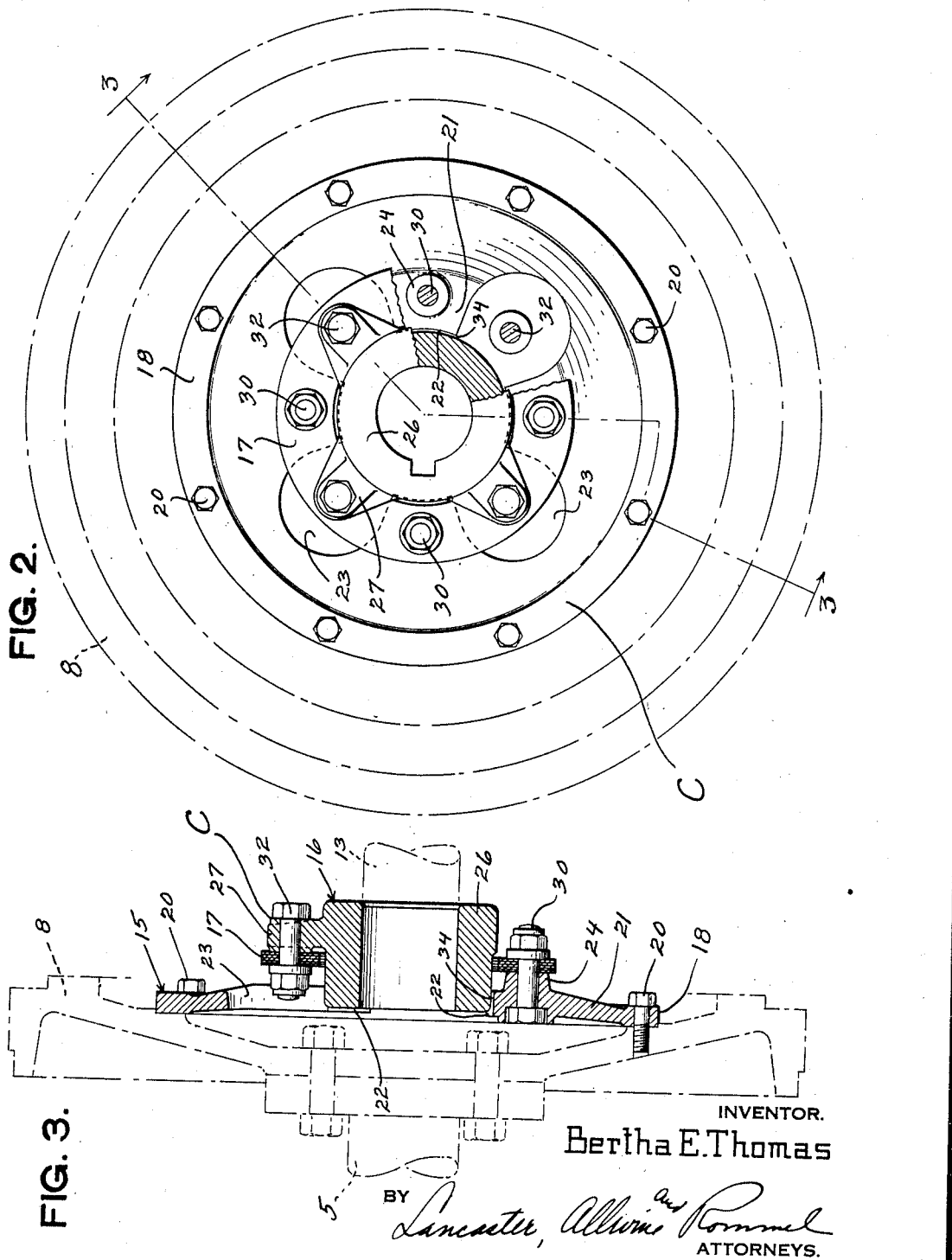

Patented Aug. 5, 1941

2,251,722

UNITED STATES PATENT OFFICE 2,251,722

EMERGENCY SUPPORT FOR FLEXIBLE COUPLINGS

Bertha E. Thomas, Warren, Pa., assignor to Thomas Flexible Coupling Company, Warren, Pa., a corporation of Pennsylvania Application August 8, 1939, Serial No. 289,058

7 Claims. (Cl. 64—13)

The present invention relates to flexible shaft couplings and more particularly to flexible couplings for three bearing direct connected drives such as employed in connection with single bearing generators, fans, hydraulic couplings, etc.

In what is generally known as three bearing direct connected drives for generators, the generator has but a single bearing and the rotor of the generator is partially supported by the two or more bearings of the driving motor or other prime mover. The shafts of the drive and driven machines are usually connected by a flexible coupling which not only provides for flexibility but also supports the weight of the driven machine shaft. In the case of a single bearing generator, should this flexible coupling fail, the generator shaft would drop at one end and allow the rotating rotor to drag against the stator with resultant wrecking of the generator.

It is therefore a primary object of the present invention to provide a flexible coupling for three bearing direct connected generator drives embodying a construction whereby damage to the generator will be prevented upon failure of the flexible coupling.

A further object of the invention is to provide an emergency support for single bearing generator couplings whereby the weight of the rotor will be supported upon an auxiliary support upon failure of the coupling and prevent contact of the rotor with the stator.

A further object is to provide a flexible coupling of this character embodying cooperatively related auxiliary supporting elements carried by the drive and driven shafts and normally having a clearance which is slightly less than the air gap or clearance between the rotor and the stator of the generator.

A further object of the invention is to provide a flexible coupling of this character having a construction permitting very close coupling between the prime mover and generator.

A still further object resides in the specific formation of the coupling members to permit ready and easy assembling of the flexible coupling.

Other objects and advantages of the invention will be apparent from the following detailed description taken in connection with the accompanying drawings, forming a part of this specification and in which drawings—

Figure 1 is a view showing application of the flexible coupling to a single bearing generator having direct drive connection with an oil or Diesel engine.

Figure 2 is an enlarged plan view of the assembled coupling with fragmentary portions broken away and showing a flywheel in dot and dash lines.

Figure 3 is a section substantially on the line 3—3 of Figure 2.

Figure 4 is a plan view of the coupling member for attachment to the engine flywheel.

Figure 5 is a plan view of the coupling member for attachment to the generator shaft.

Figure 6 is a diagrammatic view illustrating application of the invention to a three bearing direct connected drive.

Referring to the drawings in detail and wherein like reference characters designate corresponding parts thruout the several views, the invention has been shown by way of example, connecting a Diesel engine to a single bearing generator. It is to be understood, however, that the coupling may also be applied to other direct connected drives employing a three bearing arrangement, such for instance, as in a three bearing motor generator set, fans, hydraulic couplings, etc.

In the drawings, the letter A designates a prime mover such as a Diesel engine having direct connected drive with a generator B thru the single engagement flexible coupling C. Particularly in connection with electric drives for locomotives, limited space makes close coupling between the prime mover and generator desirable and the single bearing generator permits of this close coupling of the generator to the prime mover. In such single bearing constructions, however, it will be seen from Figures 1 and 6 that a portion of the weight of the rotor of the generator is supported by the flexible coupling C. The present invention embodies in the flexible coupling C an auxiliary support which comes into action and carries the weight of the generator rotor upon failure of the flexible elements of the coupling.

The engine A may be of any preferred type and has the crankshaft 5 journaled in two or more bearings 6 in the engine frame 7. The crankshaft 5 has the usual flange at one end for attachment of a flywheel 8.

The generator B is of the single bearing type to permit close coupling to the engine A and embodies a stator frame 9 having a bearing 10 in one end thereof. Enclosed within the frame 9 is the usual stator windings or coil 11. Rotatable in the stator 9 is a rotor 12 including a shaft 13 which is journaled at one end in the bearing 10. The rotor 12 is spaced from the stator 11 and forms an air gap 14.

The flexible coupling C provides a connection between the engine or driving shaft 5 and the rotor or driven shaft 13, and serves to support one end of the rotor shaft as well as providing for flexibility between the connected shafts. The coupling C is of all metal construction and comprises a pair of coupling members 15 and 16 which are respectively connected to the shafts 5 and 13, and a flexible laminated metal ring 17 providing a flexible connection between the members 15 and 16.

Referring first to the construction of the coupling member 15, the same is in the form of a dished or concaved disc providing an annular attaching rim 18 provided with a series of openings 19 adapted to receive bolts 20 for securing the disc to the flywheel 8 with the concaved side of the disc confronting the flywheel as in Figure 3. Extending radially inward from the rim 18 is a series of support arms 21 having their inner ends rounded as at 22 on a circle concentric with the rim 18 and providing a series of annularly spaced apart internal supporting surfaces 22. As shown more clearly in Figure 4, the support arms 21 have substantially large spaces or openings 23 between adjacent arms and form a cloverleaf design for a purpose to be later described. Projecting from the inner end portion of each arm 21, at the outer or convex side of the disc, is a spacing lug or boss 24 each having an axial opening 25 parallel to the axis of the disc.

The coupling member 16 embodies a tubular hub 26 adapted to be keyed or splined to the free or floating end of the shaft 13 and having an external diameter at its inner end which is slightly less than the diameter of the circle on which the supporting surfaces 22 are formed. Projecting radially from the outer end portion of the hub 26 is a series of driving lugs 27 each having an opening 28 parallel to the axis of the hub. These openings 28 are arranged in annular relation on a radius equal to that of the openings 25 in the disc 15.

The coupling ring 17 for providing a flexible coupling between the members 15 and 16 is preferably in the form of a laminated metal ring having a series of evenly spaced apart openings for receiving coupling bolts whereby the ring is connected at alternate points to the coupling members. As shown in Figures 2 and 3, the ring 17 is secured to the coupling member 15 at four evenly spaced apart points by the bolts 30 passed thru the openings 25, and secured to the coupling member 16 at four evenly spaced apart points between the bolts 30 by bolts 32 passed thru the openings 28. The heads of the coupling bolts 30 are recessed into sockets formed in the inner concaved side of the disc 15 whereby these bolt heads are substantially flush with the inner surface of the disc. By forming the disc with the open spaces 23, and slightly dishing the disc, ready and easy access may be had to the bolts 32 when assembling and dismembering the coupling.

When the flexible coupling is in assembled condition, it will be noted that the inner end of the hub 26 projects axially into the disc 15 between the arms 21 but out of actual bearing contact with the supporting surfaces 22 and forms a small space or clearance 34 about the inner end of the hub. The flexible ring 17 acts to maintain this clearance 34 and yet permit slight angular misalignment of the connected shafts 5 and 13. As shown in Figure 6, the clearance or space 34 between the support arms 21 and the hub 26 is less than the air gap 14 formed between the stator and the rotor of the generator. Under these conditions it will be apparent that should the flexible coupling ring 17 fail, the hub 26 which is keyed to the floating shaft 13 of the generator will be supported upon the internal supporting surfaces 22 prior to any contact of the rotating rotor with the stator of the generator. Thus there will be no damaging of the generator thru possible failure of the flexible coupling ring 17.

The flexible coupling C thus forms an emergency support for single bearing generator couplings such as will prevent damage and possible wrecking of the generator should the coupling fail.

The construction of the coupling is also such as to permit very close coupling of the generator to the prime mover where space is limited.

Changes in detail may be made to the form of the invention herein shown and described, without departing from the spirit of the invention or the scope of the following claims.

I claim:

1. In a three bearing motor-generator set, said generator having a single bearing, a self-contained flexible coupling unit connecting the shafts of the motor and the generator and provided with concentrically arranged normally spaced apart emergency supporting surfaces normally having a clearance space which is less than the air gap of the generator.

2. In combination with a prime mover having a drive shaft, and a generator having a rotor shaft, a self-contained emergency supporting coupling comprising a coupling member secured to the drive shaft and having an internal circular supporting surface, a coupling member secured to the rotor shaft and having a cylindrical hub providing an external supporting surface arranged concentrically within the internal supporting surface, and a flexible ring connecting the coupling members, said supporting surfaces being normally spaced apart and having a clearance which is less than the air gap of the generator.

3. A combined coupling and emergency support for single bearing shafts, comprising a coupling disc having an axial opening providing an internal circular supporting surface, a coupling hub having an external cylindrical supporting surface, and a flexible ring connecting the coupling disc and hub with the supporting surfaces in annular confronting relation and being normally out of contact with one another.

4. A flexible coupling and emergency support comprising a dished coupling disc having an axial opening providing an internal circular supporting seat, a coupling sleeve having an external annular supporting seat of slightly less diameter than said internal seat fitting in said axial opening from the convex side of the dished coupling disc, and a flexible ring co-axially connecting the disc and sleeve with the supporting seats in concentrically spaced apart relation.

5. A coupling of the class described, comprising a dished coupling disc having an annular attaching rim and spaced apart arms extending radially inward from the rim and provided with concaved arcuate seats at their inner ends, a coupling hub at the convex side of the disc and having an annular seat at one end extending between the seats on said arms and slightly spaced therefrom, and a flexible ring connecting the coupling disc and hub.

6. A coupling of the class described, comprising a dished coupling disc having an annular attaching rim and spaced apart arms extending radially inward from the rim and providing annularly arranged seats at their inner ends, a spacer lug on each arm at the convex side of the disc, a coupling hub at the convex side of the disc and having an annular seat at its inner end extending concentrically of the seats on said arms and slightly spaced therefrom, radially extending driving lugs on the outer end of the hub for aligning with the spaces between said arms, a flexible transmission ring, and coupling bolts alternately connecting the ring to the spacer lugs and driving lugs.

7. A flexible coupling comprising a dished coupling disc having an annular attaching rim and an axial opening, a coupling hub at the convex side of the disc and having a tubular inner end portion loosely extending into said axial opening, and a laminated metal ring connected at alternate points to the disc and to the outer end of the hub and normally retaining the hub out of contact with the disc.

BERTHA E. THOMAS.